United States Patent [19]

Marshall et al.

[11] 3,940,544
[45] Feb. 24, 1976

[54] PRODUCTION OF POLYESTER YARN

[75] Inventors: Robert Moore Marshall, Chester;
Kimon Constantine Dardoufas,
Richmond, both of Va.

[73] Assignee: Allied Chemical Corporation, New York, N.Y.

[22] Filed: June 28, 1974

[21] Appl. No.: 484,055

[52] U.S. Cl............. 428/378; 57/140 C; 156/110 A; 156/330; 156/331; 252/8.9; 427/412; 427/413; 427/417; 427/418; 428/295; 428/380; 428/382; 428/383; 428/395
[51] Int. Cl.². B29H 9/02; B32B 25/02; B32B 27/02
[58] Field of Search 57/140 C; 117/80, 90, 138.8 F, 117/161 UE, 167, 69; 252/8.9; 156/110 A, 330, 331; 161/175, 176; 427/207, 412, 413, 417, 418; 428/295, 378, 380, 382, 383, 395

[56] References Cited
UNITED STATES PATENTS

| | | | |
|---|---|---|---|
| 2,425,755 | 8/1947 | Roberts et al. | 260/615 |
| 3,476,701 | 11/1969 | Aldrad et al. | 117/80 |
| 3,496,122 | 2/1970 | Niklaus et al. | 252/8.9 |
| 3,513,057 | 5/1970 | Falcone et al. | 156/110 A |
| 3,549,481 | 12/1970 | Cesare et al. | 156/110 A |
| 3,672,977 | 6/1972 | Dardoufas | 117/76 T |
| 3,673,022 | 6/1972 | Jevaini et al. | 117/80 |
| 3,687,721 | 8/1972 | Dardoufas | 117/138.8 F |
| 3,718,587 | 2/1973 | Bhakuni et al. | 117/138.8 F |
| 3,741,966 | 6/1973 | Weedon et al. | 117/138.8 F |

*Primary Examiner*—J. C. Cannon
*Attorney, Agent, or Firm*—Fred L. Kelly

[57] ABSTRACT

An improved polyethylene terephthalate tire yarn is prepared by applying to the yarn a finish composition comprising a polyalkylene glycol compound having the formula

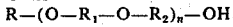

in which $R_1$ and $R_2$ are the same or different lower alkylene units such as ethylene, propylene and so forth up to 5 carbon atoms, R is an alkyl group containing 1 to 8 carbon atoms, and $n$ has a value to produce a molecular weight of at least about 300; and about 5 to 35 parts per 100 parts, by weight, of said polyalkylene glycol compound of a triol compound having the formula:

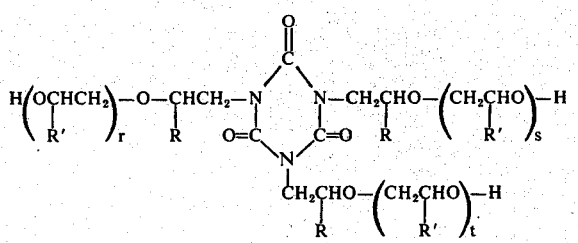

wherein R and R' are independently at each occurrence hydrogen, methyl or ethyl and $r$, $s$, and $t$ are integers from 1 to about 20. This method of finishing the tire yarn results in an improved adhesion of the fiber to rubber.

3 Claims, No Drawings

PRODUCTION OF POLYESTER YARN

BACKGROUND OF THE INVENTION

This invention relates to multifilament polyester yarns and particularly to improved multifilament polyethylene terephthalate yarns for industrial uses. More particularly, it relates to an improved multifilament polyethylene terephthalate yarn and a new fiber finishing process for polyethylene terephthalate yarns in which novel fiber finish compositions are applied to said yarns. Still more particularly, it relates to a fiber finish composition designed specifically for tire cord processing for polyethylene terephthalate yarns.

Many fiber finish compositions are known. Some are quite specific in composition and relate to specific type fibers. Small changes in fiber finish composition frequently result in tremendous improvements in not only processing but also in end use of the fiber.

Polyester tire yarn finishes generally consist of a combination of a lubricant, an antistat, and several emulsifiers. For example, U.S. Pat. No. 3,687,721 discloses an improved polyester tire yarn treated with a composition comprising decaglycerol tetraoleate, glycerol monooleate, ethoxylated tall oil fatty acid, sulfated glycerol trioleate, ethoxylated alkylamine and hexadecyl stearate. Obviously, maintaining the proper ratio of lubricant, antistat and emulsifiers is essential for consistent performance of the tire yarn. Moreover, many prior art processes require applying a first finish composition during spinning of the yarn and a subsequent overfinish in order to obtain optimum physical properties. Clearly, it would be a significant advance in this art to find a finish that could be used as a single finish for polyester yarn or as an overfinish to provide a tire yarn with excellent properties for use in tires.

Linear high molecular weight polyethylene terephthalate fiber forming polyesters are well known. Such knowledge is well illustrated in U.S. Pat. Nos. 2,465,319; 3,050,533; 3,051,212; 3,427,287 and 3,484,410 as well as many others. Although polyester tire yarn is a highly successful commercial product, even further improvements are desirable. Greater strength is always being sought, and in order to obtain improved thermal stability, lower carboxyl end groups are necessary. Upon obtaining lower carboxyl end groups either by chemical or physical means, adhesion loss of the final textile material to rubber becomes significant. The production of a thermally stable polyester with good adhesion to rubber is, to a great degree, the substance of this invention.

SUMMARY OF THE INVENTION

Therefore, it is an object of this invention to provide an improved polyester multifilament yarn which is treated with an improved finish composition.

It is another object of this invention to provide a method of finishing polyester tire yarn which results in an improved adhesion of the fiber to rubber.

Further, this invention provides a process for the modification of the surface of a polyester fiber having fewer than 25 meq/kg carboxyl end groups, to improve adhesion of the fiber to rubber.

These and other object are accomplished in accordance with this invention with a finish for polyester yarns comprising a polyalkylene glycol compound having the formula $$R-(O-R_1-O-R_2)_n-OH$$

in which $R_1$ and $R_2$ are the same or different alkylene units having up to 5 carbon atoms, R is an alkyl group containing 1 to 8 carbon atoms and $n$ has a value to produce a molecular weight of at least about 300; and about 5 to 35 parts per 100 parts by weight of said polyalkylene glycol compound of a triol compound having the formula

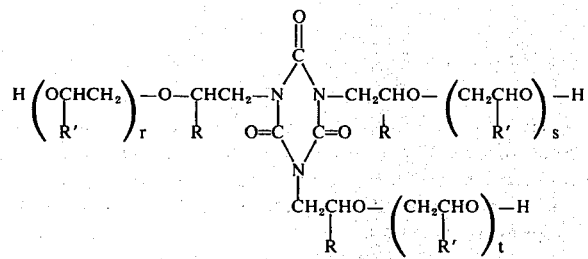

wherein R and R' are independently at each occurrence hydrogen, methyl or ethyl and $r$, $s$, and $t$ are integers from 1 to about 20. The finish composition may be diluted with water to a water content up to about 80 weight percent of the diluted composition. The finish composition is applied to polyester yarns including, for example, polyethylene terephthalate yarns by any known means including bath, spray, padding, kiss roll application or the like. The finish composition may be used as a single finish or as an overfinish. Normally, the composition is applied to the yarn in an amount sufficient to supply 0.5 to 1.5 percent of the polyalkylene glycol compound, based on the weight of the yarn. Preferably, the polyalkylene glycol compound has a molecular weight of 300 to 600 and a viscosity of 100 to 200 S.U.S. at 100° F. The yarn may be made into tire cord by known procedures.

In preferred embodiments of the invention, designed for superior performance under the most adverse conditions, the above finish composition also contains 1 to 6 parts per 100 parts, by weight, of the polyalkylene glycol compound of a polyepoxide compound having at least two epoxy groups, a melting point below 150° C. and a molecular weight below 3,000. The preferred epoxy compounds are the liquid aliphatic epoxy compounds which are soluble or easily dispersible in water. Such compounds are commonly prepared by the reaction of halohydrins with polyhydric alcohols as, for example, the reaction of epichlorohydrin with glycerol. Such compounds are disclosed in *Epoxy Resins* by Lee and Neville, McGraw-Hill Book Company, Inc. (New York 1957), pages 1–21.

As mentioned above, the value of $n$ in the formula $$R-(O-R_1-O-R_2)_n-OH$$

is such as to yield a molecular weight of at least about 300. There is no known maximum limitation for the molecular weight although the lower range, particularly that of from 300 to 600, is preferred since compounds in this range are more water soluble as well as being more available and economical. The critical nature of the minimum molecular weight of the polyalkylene glycol compound results from the fact that excessive fuming during processing of the fiber and poor static protection results when the molecular weight is less than about 300.

The preferred polyalkylene glycol compounds of the present invention are so-called random copolymers, preferably, random copolymers made from ethylene oxide and propylene oxide. Ethylene oxide and propylene oxide are reacted simultaneously to form mixed polyalkylene glycol compounds. For example, with alcohols, mixed polyoxyethylated-polyoxypropylated monoethers result in accordance with the following equation:

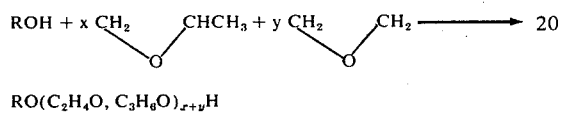

RO(C$_2$H$_4$O, C$_3$H$_6$O)$_{x+y}$H where R is as described above, where $x$ is the number of moles of propylene and $y$ is the number of moles of ethylene oxide. We prefer to use such compounds which are condensation products of 40 to 60 percent ethylene oxide and 40 to 60 percent propylene oxide on a mole basis, terminated with an alcohol containing 3 to 5 carbon atoms. Typical prior art in this field includes U.S. Pat. Nos. 2,425,755 and 2,425,845.

Polyalkylene glycols and their derivatives made by such procedures are sold under the trade-name Ucon (Union Carbide Corporation). The code number after the series designation indicates the viscosity at 100° F. in Saybolt universal seconds (S.U.S.) in the Ucon series. All members of the Ucon 50-HB and Ucon 75-H series are water soluble while the Ucon LB and Ucon D series are water-insoluble. -insoluble. For use in the present invention, the water-soluble compounds are preferred. Optimum results have been obtained with polyoxyethylated-polyoxypropylated monoethers which are condensation products of 50 percent ethylene oxide and 50 percent propylene oxide terminated with butyl alcohol, said monoethers having a viscosity of 75–300 S.U.S., preferably 100 to 200 S.U.S. at 100° F.

The triol compounds of the present invention are known compounds and some are readily available. They are preferably prepared from tris(2-hydroxyethyl)isocyanurate by reaction with propylene oxide and/or ethylene oxide. The triol compounds are similar to the triol compounds of U.S. Pat. No. 3,728,305 but have a significantly lower molecular weight.

In addition to the critical nature of the finish composition, it has also been found that the heat treatment of the yarn subsequent to the application of the process finish composition is likewise desirable for achieving optimum results in accordance with the invention. The use of too high a temperature of heat treatment will cause fusion of the fibers as well as causing a drop in strength properties. The maximum temperature will be governed by the melting point or degradation of the particular fibers used. The minimum temperature necessary to achieve optimum heat stability of the tire cord in this process has been found to be about 200° C. when polyethylene terephthalate is the polyester fiber. The preferred temperature is from about 210° to 230° C.

Furthermore, the time/temperature relationship of the heat treatment must be carefully controlled so that the fiber properties do not suffer impairment. Too long a treatment, even a preferred temperatures will tend to degrade the fibers. Normally, the heat treating step will be carried out so that the surface of the fibers will be raised rapidly to a temperature of 200° to 230° C., preferably 210° to 230° C. and kept at that temperature for several seconds, preferably 45 to 120 seconds, although no absolute time can be set for optimum results. A satisfactory criterion for determining the best time/temperature relationship is to measure the heat stability of the fiber, both heat treated and untreated. Of course, the instant heat treatment should significantly improve the adhesion of the fiber to rubber. Any means for heating the surface of the fiber may be used and a large variety of suitable apparatus is available in the trade.

Certain tests utilized in illustrating this invention are defined below. First, the strip adhesion test is carried out as follows:

STRIP ADHESION TEST

1. A layer of rubber is placed on a fabric winding drum.

End View

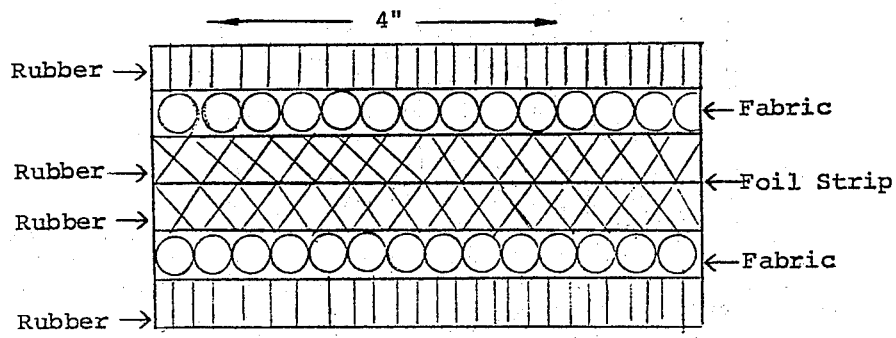

2. The test cord is wound onto the drum at 20 ends per inch to obtain a 5 inch width. 3. This rubberized fabric is used to fabricate specimens having the composition shown in the following sketch:

Side View

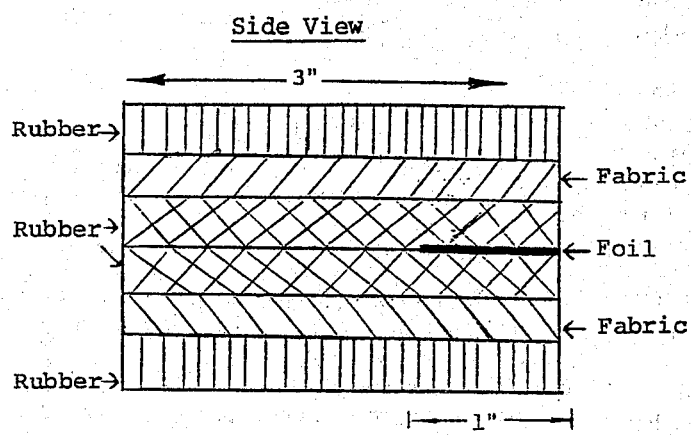

4. This "sandwich" is cured in a mold for 6 minutes at a pressure of 4 tons and a temperature of 350° F.

5. Three 1 × 3 inches strip having the cord parallel to the long dimension are cut from the cured sandwich.

6. These are pre-heated for 30 minutes at 250° F. and peeled on an Instron tester using 5 inch per minute cross head speed and 0.5 inch per minute chart speed. Adhesion strength is recorded in pounds.

7. The peeled samples are visually rated on a 1 to 5 scale. If no cord is visible, the rating is 5.0. If equal amounts of rubber and cord are visible in the peeled sample, the rating is 2.5, etc.

"H" ADHESION TEST

The H adhesion test is carried out by a modification of ASTM D 2138-67. One quarter inch rubber strips are used to prepare 1,000 denier, 3 ply cord samples and ⅜-inch rubber strips are used to prepare 1,300 denier, 3 ply cord samples. Tests are conducted both at room temperature and at elevated temperature (250° F). The samples for elevated temperature testing are pre-heated for 3 minutes at 250° F. before being tested at 250° F. on an Instron Tester which is outfitted with an environmental chamber.

Other terms used throughout the specification and claims are either defined when first used or are known within the art.

DESCRIPTION OF THE PREFERRED EMBODIMENT

In order to demonstrate the invention, the following examples are given. They are provided for illustrative purposes only and are not to be construed as limiting the scope of the invention, which is defined by the appended claims. In these examples, parts and percentages are by weight.

The yarns of this invention can be processed by any spin draw process or spinning and separately drawing process available to the art in the patent and technical literature, using any suitable polyester which provides the high tenacity yarn of about 9 grams per denier and minimum elongation of about 13 percent.

The preferred polyesters are the linear terephthalate polyesters, i.e., polyesters of a glycol containing from 2 to 20 carbon atoms and a dicarboxylic acid component containing at least about 75% terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-di-benzofurandicarboxylic acid. The glycols may contain more than two carbon atoms in the chain, e.g., diethylene glycol, butylene glycol, decamethylene glycol, and bis-1,4-(hydroxymethyl)cyclohexane. Examples of linear terephthalate polyesters which may be employed include poly(ethylene terephthalate), poly(butylene terephthalate), poly(ethylene terephthalate/5-chloroisophthalate) (85/15), poly(ethylene terephthalate/5-[sodium sulfo]isophthalate) (97/3), poly(cyclohexane-1,4-dimethylene terephthalate), and poly(cyclohexane-1,4-dimethylene terephthalate/hexahydroterephthalate) (75/25).

In accordance with one preferred embodiment of the invention, a synthetic filamentary yarn comprised of polyethylene terephthalate filaments is first treated with from about 0.3 to about 0.6 weight percent based on the weight of the yarn of a liquid composition consisting essentially of about 10 to about 20 weight percent of said composition of each hexadecyl stearate and refined coconut oil, about 3.0 to about 6.0 weight percent of said composition of ethoxylated tallow amine, about 10 to about 20 weight percent of said composition of ethoxylated lauryl alcohol, about 8.0 to about 12.0 weight percent of said composition of sodium salt of alkylarly sulfonate, about 1.0 to about 3.0 weight percent of dinonyl-sodium-sulfosuccinate, about 1.0 to about 3.0 weight percent of said composition of 4,4'-thio-bis-(3-methyl-6-tert-butylphenol), about 35 to 50 weight percent of said composition of white mineral oil having a boiling point of between 510° and 620° F. wherein at least about 0.15 to about 0.30 weight percent is retained on said yarn. The yarn is then treated with the novel finish composition of the present invention in the manner described hereinabove.

EXAMPLE 1

First, a polyethylene terephthalate tire yarn was prepared as described in U.S. Pat. No. 3,672,977, i.e., a 1,300 denier, 192 filament yarn was prepared comprised of polyethylene terephthalate filaments treated with about 0.45 percent based on the weight of the yarn of a liquid spin finish consisting of 14.7 parts refined coconut oil, 14.7 parts hexadecyl stearate, 12.7 parts ethoxylated lauryl alcohol, 9.8 parts sodium petroleum sulfonate, 4.9 parts ethoxylated tallow amine, 2 parts of sodium salt of sulfonated succinic ester, 2 parts 4,4'-thio-bis(6-tert-butyl-m-cresol) and 39.2 parts mineral oil having a boiling point between 510° F. and 620° F. Drawing performance of the yarn was excellent. The yarn had an intrinsic viscosity (I.V.) of 0.89 dl/g and carboxyl end group content (COOH) of 21 meq/kg. Finish oil on the fiber was 0.2 weight percent.

Next, the finish composition of the present invention was applied as an overfinish to the yarn. This overfinish consisted of 44 parts of polyglycol ether, 5 parts of propoxylated tris(2-hydroxyethyl)-isocyanurate, 1 part of 1,2,3 triglycedyl propane, and 50 parts of water. The polyglycol ether was a condensation product of 50 percent ethylene oxide and 50 percent propylene oxide terminated with butyl alcohol, having a viscosity of 100 S.U.S. at 100°to F. The propoxylated tris(2-hydroxyethyl)-isocyanurate contained about 3.5 mols of propylene oxide per mol of the isocyanurate. The overfinish was applied onto the yarn at 1.14 percent, based on the weight of the yarn. The resulting yarn was tested as follows. Three ply 8S × 8Z cord was made and treated on a Litzler single end unit with dips consisting of first blocked diisocyanate and diepoxide and second resorcinol formaldehyde-butadiene styrene, vinyl pyridine latex. After the first dip the cords were heat treated at 149° C. for 80 seconds and 227° C. for 40 seconds. After the second dip the cords were heat treated at 149° C. for 80 seconds and 210° C. for 60 seconds. The treated cords were cured within rubber and tested for adhesion using the ⅜ inch H test, hot and cold and the strip adhesion test. Results are presented in Table I. The adhesion average values shown are based on 6 to 42 replications of the test and the standard deviation ($\sigma$) was less than 1 pound.

TABLE I

MEASURED ADHESION OF TIRE CORDS

| Cold H Adhesion* | | Hot H Adhesion* | | Strip Adhesion | | Rating |
|---|---|---|---|---|---|---|
| n | $\overline{X}$(lbs) | n | $\overline{X}$(lbs) | n | $\overline{X}$(lbs) | |
| 42 | 60 | 42 | 42 | 6 | 27 | 4.9 |

*These results show that the overfinish of the present invention significantly improves rubber adhesion as compared with the finish of U.S. Patent 3,672,977.

EXAMPLE 2

The procedure of Example 1 was followed except that the overfinish consisted of 38 parts of polyglycol ether, 10 parts of propoxylated tris(2-hydroxyethyl)-isocyanurate, 2 parts of 1,2,3 triglycedyl propane, and 50 parts of water. The polyglycol ether was a condensation product of 50 percent ethylene oxide and 50 percent propylene oxide terminated with butyl alcohol, having a viscosity of 100 S.U.S. at 100° F. The propoxylated tris(2-hydroxyethyl)-isocyanurate contained about 6.5 mols of propylene oxide per mol of the isocyanurate. The overfinish was applied onto the yarn at 1.18 percent, based on the weight of the yarn. The resulting yarn was made into three ply cord and tested as shown in Example 1. Results are presented in Table II.

TABLE II

MEASURED ADHESION OF TIRE CORDS

| Cold H Adhesion | | Hot H Adhesion | | Strip Adhesion | | Rating |
|---|---|---|---|---|---|---|
| n | $\overline{X}$(lbs) | n | $\overline{X}$(lbs) | n | $\overline{X}$(lbs) | |
| 42 | 62 | 42 | 35 | 6 | 27 | 5.0 |

EXAMPLE 3

This example shows that the finish of the present invention may be used with excellent results as a single finish.

The polyglycol ether finish used contained 44 parts of a condensation product of 50 percent ethylene oxide and 50 percent propylene oxide terminated with butyl alcohol and having a viscosity of 100 S.U.S. at 100° F., 5 parts of an ethoxylated tris(2-hydroxyethyl)-isocyanurate containing about 3.5 mols of ethylene oxide per mol of the isocyanurate, and 1 part of 1,2,3 triglycedyl propane. This finish was applied as initial finish to polyethylene terephthalate tire yarn (approximately 1300 denier, 192 filaments) by means of a kiss roll during spinning. After drawing the yarn was heated to 215°–230° C. for a few seconds. The finish yarn was readily twisted and plied into greige cord. The resulting cords were then tensilized as in Example 1. To show the effect of application rate, the application level ranged from 0.23 to 1.5 percent based on the weight of fiber. Yarns with finish levels from 0.8 to 1.0 percent were considered most desirable in view of relatively low finish required and significantly improved durability in rubber. Similar results were obtained when the 5 parts of ethoxylated tris(2-hydroxyethyl)-isocyanurate in the finish was replaced with 5 parts of propoxylated tris(2-hydroxyethyl)-isocyanurate containing about 3.7 mols of propylene oxide per mol of the isocyanurate.

We claim:

1. A synthetic filamentary yarn comprised of polyethylene terephthalate filaments having a carboxyl end group content of less than 25 meq./kg., which are first treated with from about 0.3 to about 0.6 weight percent based on the weight of the yarn of a liquid finish composition consisting essentially of about 10 to about 20 weight percent of said composition of each hexadecyl stearate and refined coconut oil, about 3.0 to about 6.0 weight percent of said composition of ethoxylated tallow amine, about 10 to about 20 weight percent of said composition of ethoxylated lauryl alcohol, about 8.0 to about 12.0 weight percent of said composition of sodium salt of alkylaryl sulfonate, about 1.0 to about 3.0 weight percent of dinonyl-sodium-sulfo-succinate, about 1.0 to about 3.0 weight percent of said composition of 4,4'-thio-bis-(3-methyl-6-tert-butylphenol), about 35 to 50 weight percent of said composition of white mineral oil having a boiling point of between 510° and 620° F. wherein at least about 0.15 to about 0.30 weight percent is retained on said yarn, and then said yarn is treated with 0.5 to 1.5 weight percent based on the weight of the yarn of a finish composition consisting essentially of a polyalkylene glycol compound having the formula $$R—(O—R_1—O—R_2)_n—OH$$

where $R_1$ and $R_2$ are the same or different alkylene units having 1 to 5 carbon atoms, R is an alkyl group containing 1 to 8 carbon atoms, and n has a value to produce a molecular weight of 300 to 600; about 5 to 35 parts per 100 parts by weight of said polyalkylene glycol compound of a triol compound having the formula

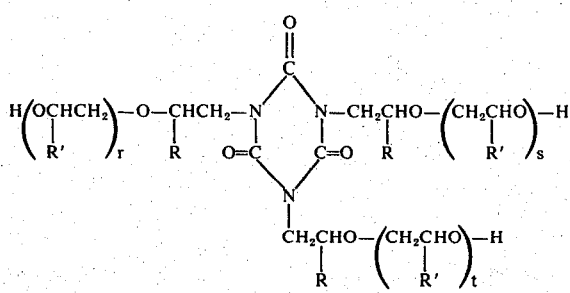

wherein R and R' are independently at each occurrence hydrogen, methyl or ethyl and $r$, $s$, and $t$ are integers from 1 to about 20; and 1 to 6 parts per 100 parts by weight of the polyalkylene glycol compound of a polyepoxide compound having at least two epoxy groups, a melting point below 150° C. and a molecular weight below 3,000.

2. The polyester yarn of claim 1 wherein the polyalkylene glycol compound is a condensation product of ethylene oxide and propylene oxide terminated with butyl alcohol, having a molecular weight of 300 to 600 and a viscosisty of 100 to 200 S.U.S. at 100° F.

3. The polyester yarn of claim 1 wherein the triol compound is propoxylated tris(2-hydroxyethyl)-isocyanurate and the polyepoxide compound is 1,2,3-triglycedyl propane.

* * * * *